United States Patent
Tagome et al.

(10) Patent No.: US 7,073,872 B2
(45) Date of Patent: Jul. 11, 2006

(54) MOTOR DRIVING APPARATUS AND DISK APPARATUS USING THE SAME

(75) Inventors: Masaki Tagome, Osaka (JP); Hisanori Nagase, Osaka (JP); Hideaki Mori, Osaka (JP); Maki Murakami, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/896,027

(22) Filed: Jul. 22, 2004

(65) Prior Publication Data

US 2005/0067890 A1    Mar. 31, 2005

(30) Foreign Application Priority Data

Jul. 23, 2003  (JP)  ............................. 2003-278329

(51) Int. Cl.
*H02P 7/04*  (2006.01)

(52) U.S. Cl. .......................................... 303/3; 318/371
(58) Field of Classification Search ........ 318/254–375; 303/3, 15, 20
See application file for complete search history.

(56) References Cited

U.S. PATENT DOCUMENTS 5,982,119 A * 11/1999 Okada et al. ............... 318/286
6,531,839 B1 * 3/2003 Shin et al. .................. 318/371
6,831,432 B1 * 12/2004 Murakami .................. 318/362
2004/0183490 A1 * 9/2004 Maeda ....................... 318/375

FOREIGN PATENT DOCUMENTS

JP          6-223489      8/1994
JP         2000-350485   12/2000

* cited by examiner

*Primary Examiner*—Christopher P. Schwartz
(74) *Attorney, Agent, or Firm*—Wenderoth, Lind & Ponack, L.L.P.

(57) ABSTRACT

A motor driving apparatus includes a position detector for detecting a rotational position of a motor to output the detection result as a position signal, a frequency comparator for comparing frequencies of continuous periods in the position signal and detecting a reversed state in which the frequency of the signal in the later period is higher than the frequency of the signal in the earlier period, a brake change over unit for selecting a reverse torque brake control which applies reverse torque to the rotor for braking or a short brake control which shorts coils of the motor for braking and instructing the brake control. The brake change over unit changes over the brake control from the reverse torque brake control to the short brake control, when a command signal for applying a reverse torque is output and the frequency comparator detects the reversed state.

16 Claims, 15 Drawing Sheets

BRAKING START

REVERSE TORUQUE BRAKE START

SHORT BRAKE START

MOTOR DRIVING APPARATUS AND DISK APPARATUS USING THE SAME

BACKGROUND ART OF THE INVENTION

1. Technical Field

The present invention relates to a motor driving apparatus for driving a motor. It further relates to a disk apparatus using the same.

2. Related Art

Recently, as a driving apparatus, of a motor used in office automation equipment or audio and video appliances, an apparatus for driving the motor by changing over current paths electronically through a plurality of transistors has been widely employed.

Generally, such a driving apparatus is used for driving motors in disk apparatuses such as optical disk apparatuses (DVD apparatus, CD apparatus) and magnetic disk apparatuses (HDD apparatus, FDD apparatus).

Disks used in the disk apparatus tend to be higher in density, and a high precision is demanded in rotation of the disk and the rotor for driving and rotating the disk.

Further, from the viewpoint of reduction of size and cost of the apparatus itself, it has been intensively attempted to develop a motor having a decreased number of position detecting elements which are indispensable for composing the motor in the prior art.

FIG. 15 shows a conventional motor, and its operation is briefly described. A rotor 2010 has a field section made of a permanent magnet, and one position detecting element 2041 detects the magnetic field of the field section of the rotor 2010. That is, the output signal of one position detecting element 2041 corresponding to the rotation of the rotor 2010 is input to a position detector 2030, and the position detector 2030 supplies output signals H1, H2, H3 mutually different in ⅓ period into a commutation controller 2060. Further, the commutation controller 2060 outputs two sets of three-phase voltage signals Kp1, Kp2, Kp3, and Kp4, Kp5, Kp6 corresponding to the entered signals H1, H2, H3. Upside power transistors 2021, 2022, 2023 are controlled in its current conduction by voltage signals Kp1, Kp2, Kp3, and downside power transistors 2025, 2026, 2027 are controlled by voltage signals Kp4, Kp5, Kp6. As a result, driving voltages of three phases are supplied to the coils 2011, 2012, 2013.

Further, in a conventional motor, in order to perform stable control in a wide range of rotational speed, it is configured to control commutation by one position detecting element in low rotational speed at which a large change in rotational speed may occur, whereas in high rotational speed only in which a small change in rotational speed may occur, without using an output signal of the position detecting element, to control commutation by detecting a counterelectromotive force generated in the coil (see, for example, patent document 1).

In another conventional motor, the rotor position is detected by one position detecting element, and thus position on control may be detected erroneously in a sudden action of the rotor. Therefore, in order to avoid such inconvenience, continuous periods of the output signal of one position detecting element is measured, and increase or decrease of the rotor rotating speed is detected, and stopping control is performed after detection of the reverse rotation of the rotor (see, for example, patent document 2).

Patent document 1: JP 2000-350485A
Patent document 2: JP 06-223489A

The prior art documents, however, relate to a motor in which the current is supplied to the coil on the basis of the estimated electric angle by the output of one position detecting element. The commutation control means depending on the output of one position detecting element involves the following problems.

In the patent document 1, since only the output of one position detecting element can be obtained as the rotation information, the rotating speed can be detected; but the rotating direction cannot be detected. Hence, in the case of stopping action by generating a reverse torque, the rotor can be once stopped by reverse torque, but the reverse torque may be further generated to provide rotation in reverse.

As a means for solving this problem, for example, in patent document 2, for the stopping operation, a pulse interval of two or more speed detection pulses depending on the rotation is measured and compared, and then increase or decrease of rotating speed is detected to detect an inverting phenomenon of rotation. When inverting phenomenon takes place, supply of current to the coil is stopped, and thereby the inverting phenomenon is prevented and stopping action is enabled. In patent document 2, however, since the brake control is started after actually detecting the inverting phenomenon, occurrence of inverting phenomenon cannot be prevented in advance. Besides, the brake control is performed by stopping current supply to the coil, and thus after the start of the brake control, motor rotation is in free-run state, and it takes a very long time until the motor is stopped completely. Further, since the increase or decrease of rotating speed is detected all the time, if a wrong speed detection pulse is measured and compared, supply of current to the coil may be stopped at a rotating speed actually not leading to reverse rotation.

In the disk apparatus for reproducing a DVD-ROM, CD-ROM, CD or the like, the rotating operation is demanded in a wide range of speed, from fast reproduction of 10,000 rpm to 200 rpm for CD reproduction, and it is demanded that the rotation driving should be stable in this rotating speed range. In a programmable disk apparatus such as DVD-RAM/RW device, because information is recorded and reproduced in a high density disk, the disk must be rotated at high precision in recording and reproducing of the disk. Not only in the optical disk apparatus, but also in the HDD, FDD and other magnetic disk apparatus, it is desired that the apparatus be manufactured at low cost, and realize stable disk rotation and driving.

SUMMARY OF THE INVENTION

The invention is devised to solve the above problems, and it is hence an object to present a motor driving apparatus with low manufacturing cost capable of stopping rotation of the rotor smoothly and promptly, and a disk apparatus capable of realizing stable recording and reproducing operation.

An apparatus for driving a motor according to the present invention includes a rotor having a field section generating field magnetic flux and plural phases of coils. The apparatus includes a power source that supplies a direct-current voltage, a power supply unit, a position detector, a controller, a frequency comparator, a rotating state command generator, and a brake changeover unit.

The power supply unit includes a plurality of switching elements, and converts direct-current voltage from the power source into a desired alternating-current voltage to supply driving power to the motor. The position detector detects a rotating position of the rotor of the motor to output the detection result as a position signal. The controller controls switching action of the switching elements of the electric power supply unit with the position signal. During a period after brake control of the motor is started and before the motor speed reaches zero, the frequency comparator compares frequencies of at least two consecutive periods in the position signal, detects and reversed state in which a frequency of the signal in a later output period becomes higher that a frequency of the signal in an earlier output period, and outputs a signal showing the detection result. The rotating state command generator outputs a command signal for exciting and controlling the coil as to apply normal torque or reverse torque to the rotor. The brake changeover unit selects either a reverse torque brake control for braking the rotation of the rotor by appling a reverse torque to the rotor, or a short brake control for braking rotation of the rotor by short-circuiting the coil of the motor, as brake control of the motor, and instructs the controller to implement the selected brake control. The brake changeover unit selects the reverse torque brake control when the detection signal from the frequency comparator does not show the reversed state, or selects the short brake control when the detection signal shows the reversed state when the rotating state command generator is issuing a command signal for applying reverse torque, and then instructs the controller to implement the selected brake control.

In the motor driving apparatus, the frequency compartor may include a reference clock signal generator that outputs a reference clock signal, a counter circut that measures the reference clock signal in a period corresponding to the position signal, a first latch circuit that latches the output of the counter circuit, a delay circuit that delays the position signal by one period, a second latch circuit that latches the output of the counter circuit in synchronism with the output of the delay circuit, and a comparison judging circuit that compares the output signal of the first latch circuit with the output signal of the second latch circuit, and detects the reversed state to output the detection signal.

The frequency comparator may detect the reversed state, only when the command signal for applying reverse torque is output from the rotating state command generator and the frequency of the position signal is lower than a predetermined value.

The frequency comparator may output the detection signal showing the reversed state, only when the command signal for applying reverse torque is output from the rotating state command generator and the frequency of the signal in the later output period is lower that ⅔ times of the frequency of the signal in the earlier output period.

The brake changeover unit may select the short brake control during a period between the moment when a duration of the earlier output period elapses after the end of the earlier output interval and the moment when the position signal of the next period is detected.

The motor driving apparatus may further include a position signal adder that adds a predetermined duration to the position signal and outputs an added position signal, wherein the controller controls the switching action of the switching elements according to the added position signal.

The frequency comparator may output a detection signal showing the reversed state, when the command signal for applying reverse torque is output from the rotating state command generator and the frequency in the period of the position signal is lower that a predetermined value.

The position detector may include a position detecting element that detects the magnetic flux of the field section of the rotor and generates the position signal.

A disk apparatus according to the present invention includes the motor driving apparatus serving as an apparatus for driving a motor which rotates and drives a recording medium, a head unit that reproduces and/or records a signal from/to the recording medium, and an information processing unit that processes a signal which is reproduced by the head unit and/or recorded information which is recorded in the recording medium by the head unit.

According to the motor driving apparatus of the invention, by comparing the consecutive rotating frequencies on the motor rotation, the timing of transfer from motor deceleration to acceleration is detected during motor braking action, and it is changed over from reverse brake to short brake after this timing, so that the motor rotation can be stopped smoothly and promptly. As a result, in a simple structure, a disk apparatus and a motor driving apparatus of rotation and driving at high reliability can be realized.

PREFERRED EMBODIMENTS OF THE INVENTION

Prefered embodiments of a motor driving apparatus and a disk apparatus of the invention are described below while referring to the accompanying drawings.

First Embodiment

Figure 1:
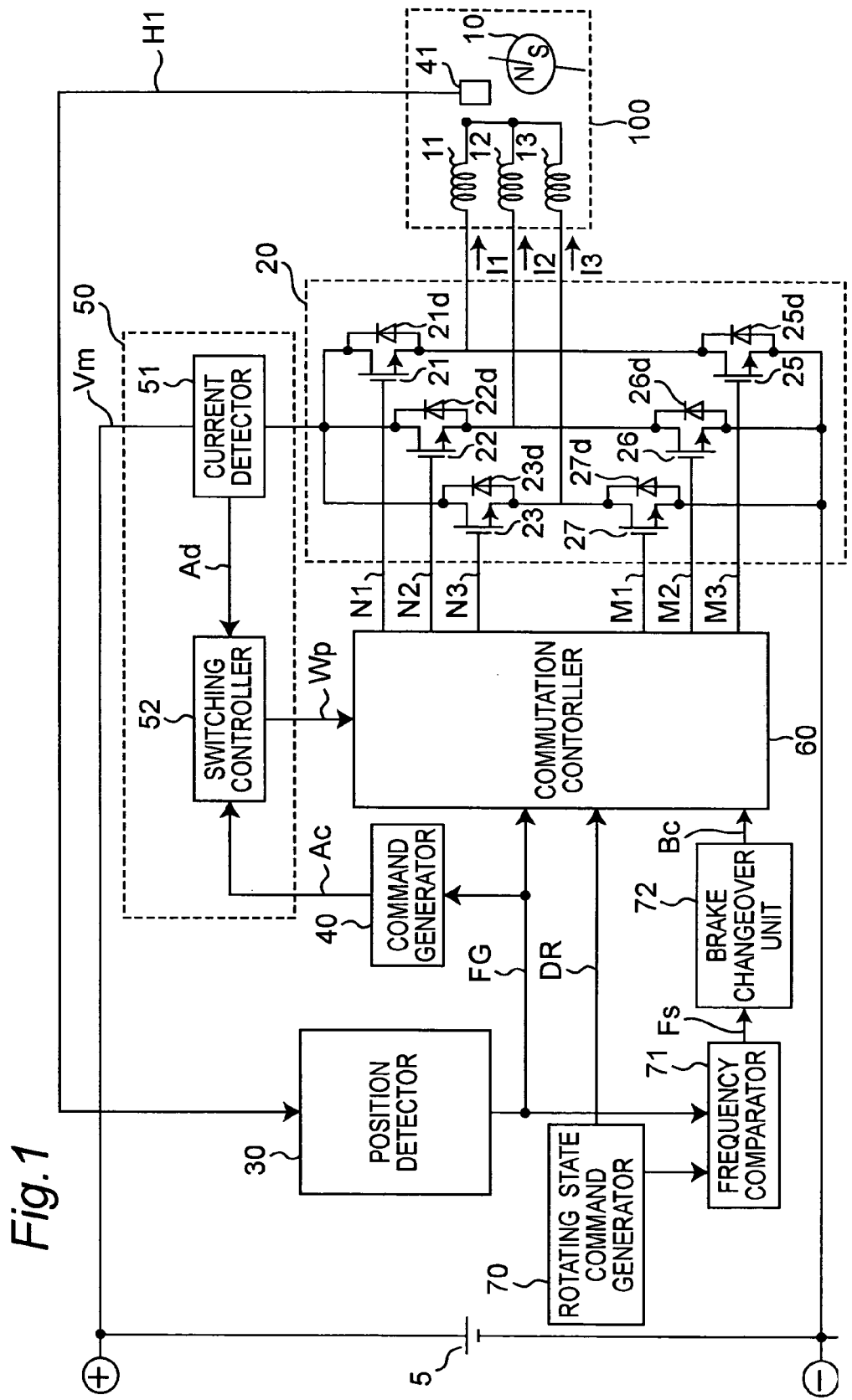
FIG. 1 is a block diagram of a motor apparatus in a first embodiment of the invention.

FIG. 1 is a block diagram of a motor apparatus in the first embodiment of the invention.

A motor 100 driven by the motor driving apparatus includes a rotor 10, a stator having three phases of coils 11, 12, 13, and a position detecting element 41 mounted in the stator. The rotor 10 has a field section for generating plural poles of field magnetic flux by magnetic flux of a magnet. Herein, it is supposed that a field section by two poles of flux of a permanent magnet is provided. Generally, however, a field section of multiple poles such as four poles or six poles may be composed.

Three phases of coils 11, 12, 13 are disposed by shifting 120 degrees electrically in relative position to the rotor 10 in the stator. Herein, an electrical angle of 360 degrees corresponds to one angle width of one set of N pole and S pole of the field system of the rotor. One end of each one of coils 11, 12, 13 is commonly connected, and other end is connected to the output terminal side of a power supply unit 20 as an electric power supply terminal.

Three phases of coils, 11, 12 13 generate three phases of magnetic flux by three phases of driving currents 11, 12, 13 and generate a driving force by the mutual action with the field system of the rotor 10, and apply the driving force to the rotor 10.

The position detecting element 41 is, for example, a Hall element, that is, a magneto-electric converting element, and it detects the magnetic pole magnetic flux of the field section of the rotor 10, and outputs a position detection signal H1 changing smoothly in amplitude depending on the rotating position of the rotor 10.

The motor driving apparatus includes a power supply unit 20, a position detector 30, a command generator 40, a switching operation unit 50, a commuttion controller 60, a rotating state command generator 70, a frequency comparator 71, and a brake changeover unit 72.

The position detector 30 receives a single position detection signal H1 output from the position detecting element 41, and processes the waveform as a digital value, and outputs a single position signal FG.

The command generator 40 detects the rotating speed of the rotor 10 by the position signal FG from the position detector 30, and creates a command signal Ac depending on the difference between the rotating speed of the rotor 10 and the target speed. Herein, the command signal Ac of the command generator 40 is a voltage signal depending on the position signal FG.

Three phases of the first commutation control signals N1, N2 and N3 and three phases of the second commutation signals M1, M2 and M3 of the commutation controller 60 are supplied to the power supply unit 20. The power supply unit 20 includes three power amplifiers 21 to 23 provided at a high voltage side, three power amplifiers 25 to 27 provided at a low voltage side, and six diodes 21d to 23d and 25d to 27d connected reversely to the individual power amplifiers, and changes over the current paths to coils 11, 12 and 13 according to the rotation of the rotor 10.

In the power supply unit 20, the power amplifiers 21 to 23 perform a high frequency switching operation depending on the first commutation signals N1, N2 and N3, and the power amplifiers 25 to 27, similarly, depending on the first commutation signals M1, M2 and M3. As a result, the direct-current voltage from the direct-current power source 5 is converted into a desired alternating-current voltage to drive the motor 100.

The switching operation unit 50 includes a current detector 51 and a switching controller 52. The current detector 51 detects commutation signals 11, 12, 13 supplied in three phases of coils 11, 12, 13 through the power amplifiers 21, 22, 23 in the power supply unit 20 from the direct-current power source 5 or a synthetic supply current Ig, and outputs a current detection signal Ad depending on the detected current value. The switching controller 52 outputs a high frequency switching pulse signal Wp depending on the result of comparison between the current detection signal Ad and command signal Ac from the command generator 40. The switching pulse signal Wp is usually a high frequency signal in a range of 20 kHz to 500 kHz. As a result, the synthesized supply current Ig is controlled by the command signal Ac. As a result, the driving currents 11, 12, 13 to the three phases of coils 11, 12 and 13 can be accurately controlled by the command signal Ac, and pulsation of generated driving force can be decreased. In other words, vibration and noise of the rotor 10 can be substantially reduced.

The rotating state command generator 70 outputs a rotating direction command signal DR for determining the rotating direction of the rotor 10.

The frequency comparator 71 compares frequencies in at least two consecutive intervals in the position signal FG output from the position detector 30, and detects a "reversed state" in which a frequency of the signal in a later interval becomes higher than that of the signal in an earlier output interval. Specifically, the frequency comparator 71 receives the position signal FG output from the position detector 30 and the rotating direction command signal DR output from the rotating state command generator 70. When the rotating direction command signal DR is a reverse rotation command, and the frequency of the later signal is higher than that of the earlier signal in consecutive position signals FG, the frequency comparator 71 makes the frequency comparison signal Fs active, and outputs the signal Fs to the brake changeover unit 72. Otherwise, the frequency comparator 71 makes the frequency comparison signal Fs non-active.

The brake changeover unit 72 outputs a brake changeover signal Bc for changing over the brake modes depending on the frequency comparison signal Fs obtained from the frequency comparator 71 to the commutation controller 60. A specific operation is described below by referring to a timing chart in FIGS. 2A to 2E.

Figure 2:
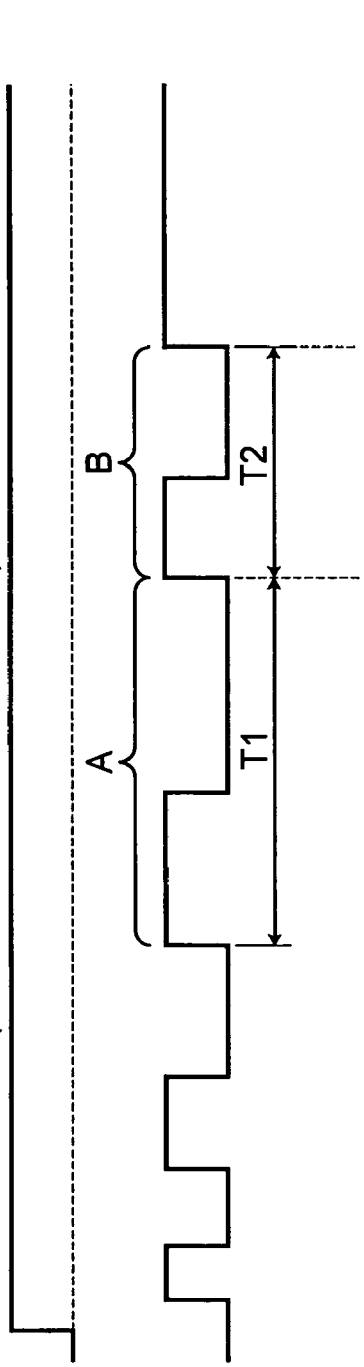
FIGS. 2A to 2E are timing charts of the motor driving apparatus in the first embodiment of the invention.

FIGS. 2A to 2E are timing charts of operation from the state of the rotor 10 rotating in normal direction by a specified frequency to the state when the output of the reverse rotation command by a rotating direction command signal Dr. In FIG. 2A, when the rotating state command generator 70 outputs the reverse rotation command for stopping the motor 100 (DR signal becoming high), the commutation controller 60 drives the switching elements 21 to 23, 25 to 27 of the power supply unit 20 depending on the position signal FG output from the position detector 30 so as to apply a reverse torque to the roter 10, and thereby, changes over the current paths of the coils 11, 12, 13. Such a control of braking by applying a reverse torque to the rotor is called "reverse torque brake control." As a result, the rotating speed of the rotor 10 gradually declines. At this time, the frequency of the position signal FG usually changing depending on the rotation of the rotor 10 is gradually lowered.

However, if the inertia of the rotor 10 is extremely small as compared with the torque generated in the rotor 10 by the power supply unit 20, as shown in FIG. 2B, after an earlier signal A (having period T1), a later signal B having a smaller period T2 than period T1 may appear. That is, the chronological magnitude relation of period (frequency) may be inverted. This phenomenon occurs because the output signal of the commutation controller 60 for changing over the current paths of the power supply unit 20 and coils 11, 12, 13 is generated on the basis of the signal of one period before in time of the position signal FG output from the position detector 30. When the inertia of the rotor 10 is extremely small as mentioned above, an excessive reverse torque is applied, and the rotation of the rotor 10 changes suddenly. At this time, a large deviation occurs between the actual position signal FG and the signal one period before in time used in the commutation controller 60, and in the worst case, a reverse torque of rotating direction of the reverse command is generated, and the operation failure occurs.

To solve this problem, and to stop rotation of the rotor more smoothly and promptly than the prior art, the present invention conducts the following control.

That is, during brake control of the motor, the frequency comparator 71 compares frequencies of two consecutive intervals in the position signal FG output from the position 30, and detects the state of the frequency of the later becoming higher than the frequency of the earlier interval, that is, "reversed state." When this reversed state is detected, the brake changeover unit 72 changes over from the "reverse torque brake control" to the "short brake control" for applying brake (short brake) to the motor 100 by shorting the coils 11, 12, 13. This process is more specifically described below.

The frequency comparator 71 measures the frequency (for example, leading edge only, of position signal FG output from the position detector 30, and judges that the reversed state is established when the later signal B is detected before passing of a period T1' which is equal to a period T1 of the earlier signal A on the basis of this position signal FG. When judging the reversed state is established, the comparator 71 changes the frequency comparison signal Fs from non-active (second state) to active (first state), and outputs it to the brake changeover unit 72 (see FIG. 2D). When receiving the frequency comparison signal Fs showing the reversed state, the brake changeover unit 72 makes the brake changeover signal Bc active ("High") to output it to the commutation controller 60.

When receiving the active brake changeover signal Bc, the commutation controller 60 outputs a control signal to the power supply unit 20 so as to short-circuit the coils 11, 12 and 13 by the power supply unit 20. By short-circuiting the coils 11, 12, 13, brake (short brake) is applied to the motor 100 (see FIG. 2E).

Hence, according to this embodiment, if a large deviation (reverse rotation) occurs between the actual position signal FG and the position signal one period before in time used in the commutation controller 60, the reverse torque control is immediately changed over to the short brake control. Thus, the motor can stop the rotor 10 more smoothly and promptly as compared with the prior art, while preventing inconvenience in the case of small inertia.

Preferably, the frequency comparator 71 should detect the reversed state on the basis of the position signal FG in the period from start of brake control of the motor until the motor speed reaches zero (the same in the subsequent preferred embodiments). For example, the reversed state may be detected on the basis of the position signal FG in the period of the rotation frequency of the rotor 10 being more than a predetermined value ($\omega_{th0}$) other than zero. In this case, during the brake control action of the motor, the state of transfer from deceleration to acceleration of the motor before stopping of the motor can be detected, and the short brake control can be started before onset of motor reverse rotation, so that occurence of motor reverse rotation can be prevented beforehand.

Second Embodiment

A motor driving apparatus in the second embodiment of the invention is described below.

Figure 3:
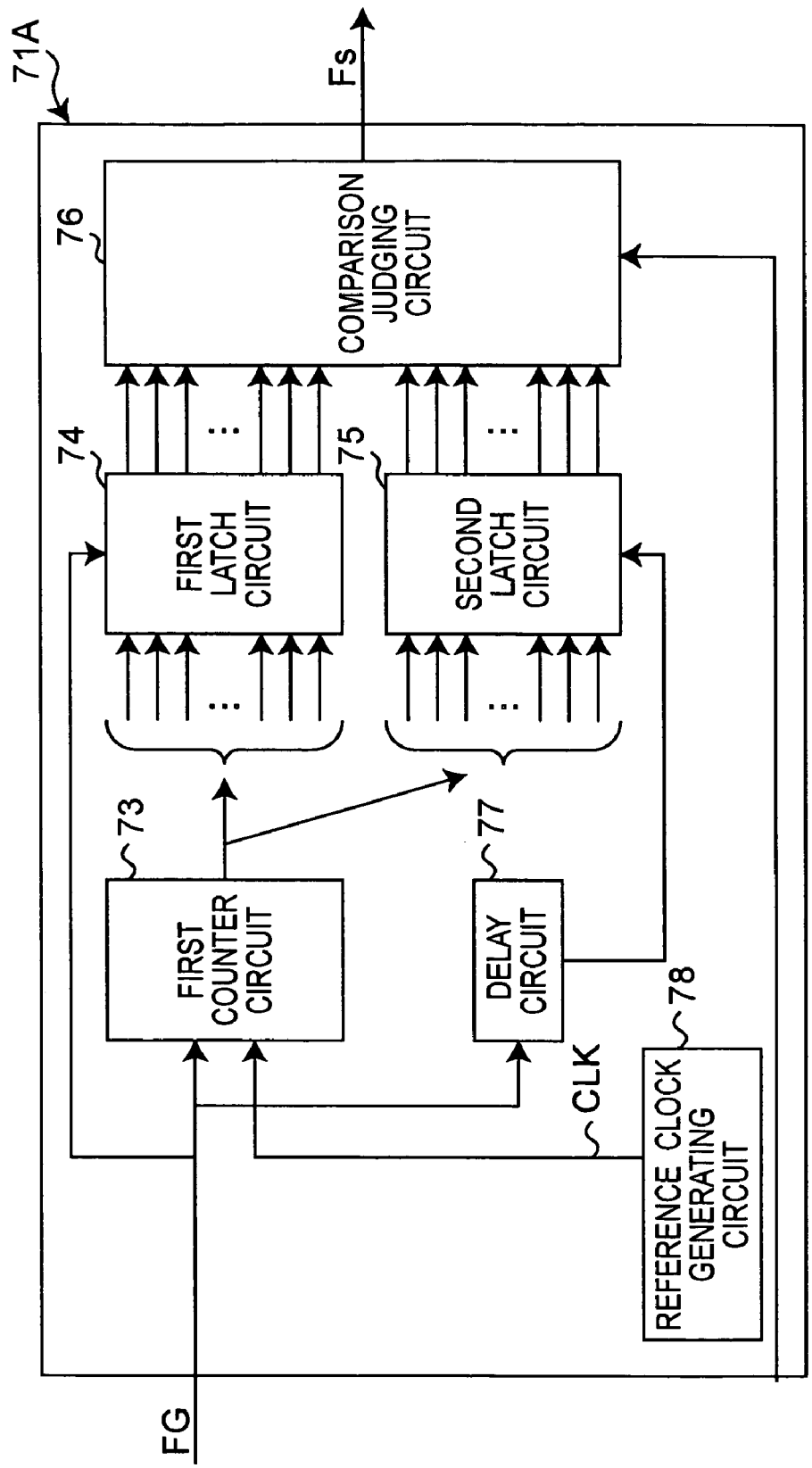
FIG. 3 is a block diagram of a frequency comparator of the motor driving apparatus in a second embodiment of the invention.

This embodiment is basically the same in structure as the first embodiment, and the internal structue of the frequency comparator is more specifically realized. FIG. 3 is a block diagram of the realized frequency comparator 71A.

The frequency comparator 71A includes a reference clock generating circuit 78 for issuing a reference clock signal CLK, a first counter circuit 73 for counting the position signal FG on the basis of the reference clock signal CLK and issuing a value corresponding to the rotation frequency of the rotor, a firts latch circuit 74 for latching the output of the first counter circuit 73 by synchronizing with the position signal FG, a delay circuit 77 for delaying the position signal FG by one period, a second latch circuit 75 for latching the output of the first counter circuit 73 by synchronizing with the output of the delay circuit, and a comparison judging circuit 76 for comparing the output of the first latch circuit 74 with the output of the second latch circuit 75.

The frequency comparator receives a position signal FG from the position detector 30, and a rotation command signal DR from the rotating state command generator 70. The input position signal FG is further fed into the first counter circuit 73 and delay circuit 77, and a reference clock signal CLK output from the reference clock generating circuit 78 is fed into the first counter circuit 73. The first counter circuit 73 counts the frequency of the input position signal FG on the basis of the reference clock signal CLK, and the count value is fed into the first latch circuit 74 and the second latch circuit 75. The first latch circuit 74 latches and outputs the count value by synchronizing with the position signal FG. The second latch circuit 75 latches and outputs the output of the first counter circuit 73 by synchronizing with the output of the delay circuit 77. Output values of the first latch circuit 74 and the second latch circuit 75 are fed into the comparison judging circuit 76. The comparison judging circuit 76 makes the frequency comparison signal Fs active (reversed state) when the output value of the second latch circuit 75 is smaller than the output value of the first latch circuit 74 (that is, the frequency of the current cycle is higher than the frequency of the previous cycle) and the rotation command signal Dr is a reverse rotation command signal.

Thus, frequencies of the position signal FG in consecutive intervals output from the position detector 30 are compared by the frequency comparator 71A, and when the rotor 10 is in a state different from the state of the rotation command signal DR output from the rotating state command generator 70 (that is, when the rotor 10 is accelerated when the rotation command signal DR is a reverse rotation command signal), the frequency comparison signal Fs showing the reversed state is output immediately, and the reverse torque brake control for braking by generating reverse torque is immediately changed over to the short brake control for braking by shortcircuiting the coils 11, 12, 13, and therefore as compared with the prior art, rotation of the rotor 10 of the motor can be stopped more smoothly and promptly. Further, the frequency comparator 71A is completely composed of logic circuits, and a very inexpensive motor driving apparatus can be realized.

Third Embodiment

A motor driving apparatus in the third embodiment of the invention is described below.

Figure 4:
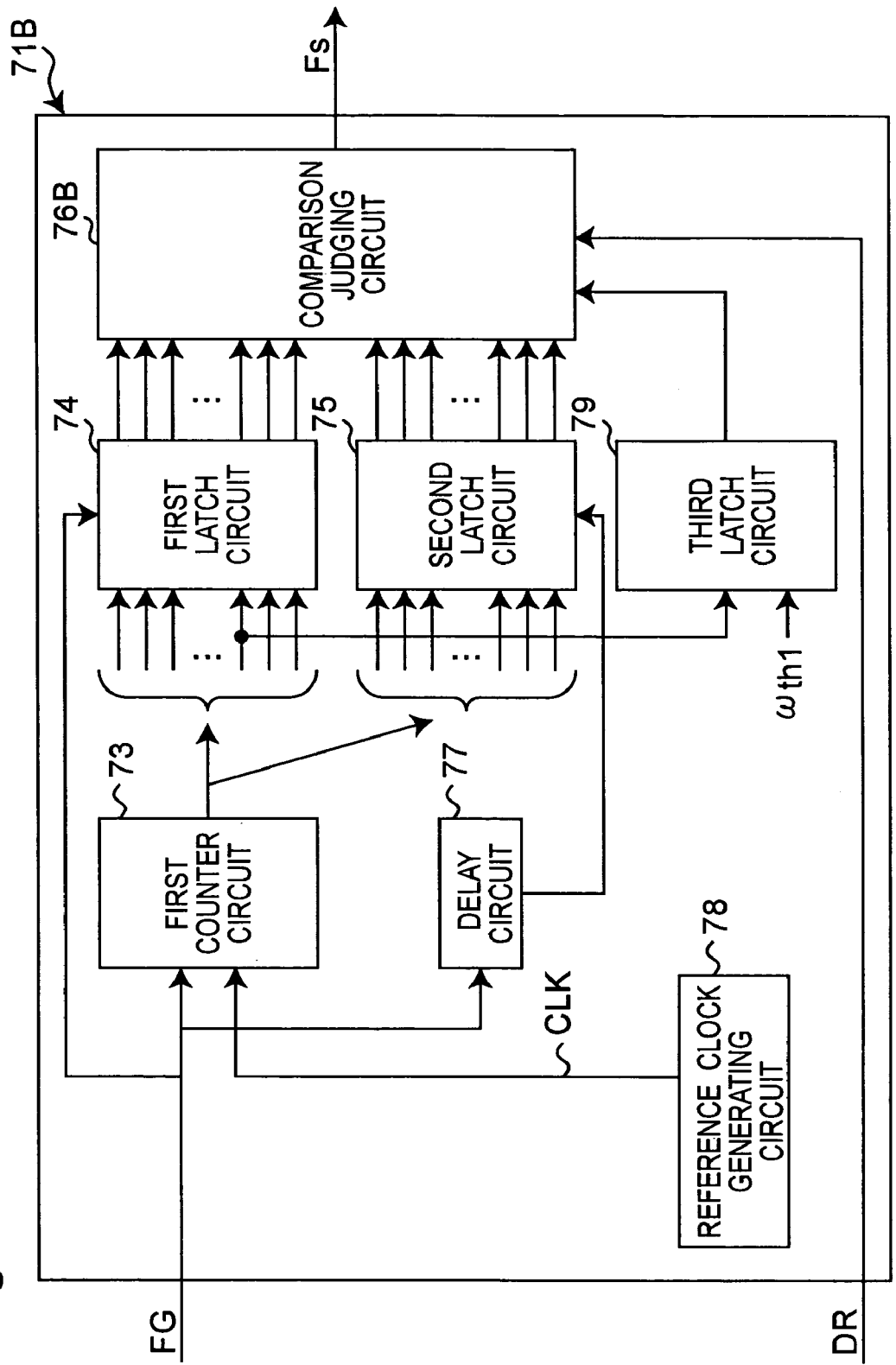
FIG. 4 is a block diagram of the frequency comparator of the motor driving apparatus in a third embodiment of the invention.

This embodiment is the same in basic structure of the motor driving apparatus as the first embodiment, but the frequency comparator is different from that of the second embodiment (FIG. 3). FIG. 4 is a block diagram of a frequency comparator 71B.

The frequency comparator 71B of the present embodiment detects the reversed state by comparing frequencies only when the rotation frequency of the rotor 10 is lower than or equal to a predetermined value ($\omega_{th1}$). That is, when the rotation frequency of the rotor 10 is higher than the predetermined value ($\omega_{th1}$), the frequency comparator 71B always outputs non-active frequency comparison signal Fs. It is noted that the predetermined value ($\omega_{th1}$) may be set to satisfy the relation of $\omega_{th1} > \omega_{th0}$ when the set value ($\omega_{th0}$) is present.

In FIG. 4, the frequency comparator 71B includes a first counter circuit 73 for counting a position signal FG on the basis of a reference clock signal CLK, and issuing a value corresponding to the rotation frequency of the rotor 10, a first latch circuit 74 for latching the output of the first counter circuit 73 by synchronizing with the position signal FG, a delay circuit 77 for delaying the position signal FG by one period, a second latch circuit 75 for latching the output of the first counter circuit 73 by synchronizing with the output of the delay circuit 77, a comparison judging circuit 76B operable to compare the output of the first latch circuit 74 with the output of the second latch circuit 75, and a third latch circuit 79 for receiving and latching at least one output signal from the first counter circuit 73.

The operation of other than that of the third latch circuit 79 and comparison judging circuit 76B is the same as the second embodiment, and specific description is ommitted herein.

The count value of the first counter circuit 73 is expressed in plural bits. Of the plural bits, at least one output signal (one bit) of the first counter circuit 73 that corresponds to the specified rotation frequency ($\omega_{th1}$) of the rotor 10 is fed into the third latch circuit 79. On the basis of the input signal, the third latch circuit 79 outputs a corresponding signal if the rotation frequency of the rotor 10 is less than the predetermined value ($\omega_{th1}$).

The output signal of the third latch circuit 79 is fed into the comparison judging circuit 76B. Only when the output signal of the third latch circuit 79 shows that the rotation frequency of the rotor 10 is equal to or less than the predetermined value ($\omega_{th1}$), the comparison judging circuit 76B compares the output signal of the first latch circuit 74 with the output signal of the second latch circuit 75 thus to detect the reversed state. When the output signal of the third latch circuit 79 does not show that the rotation frequency of the rotor 10 is equal to or less than the predetermined value ($\omega_{th1}$), the comparison judging circuit 76B always makes the position signal Fs non-active.

Figure 5:
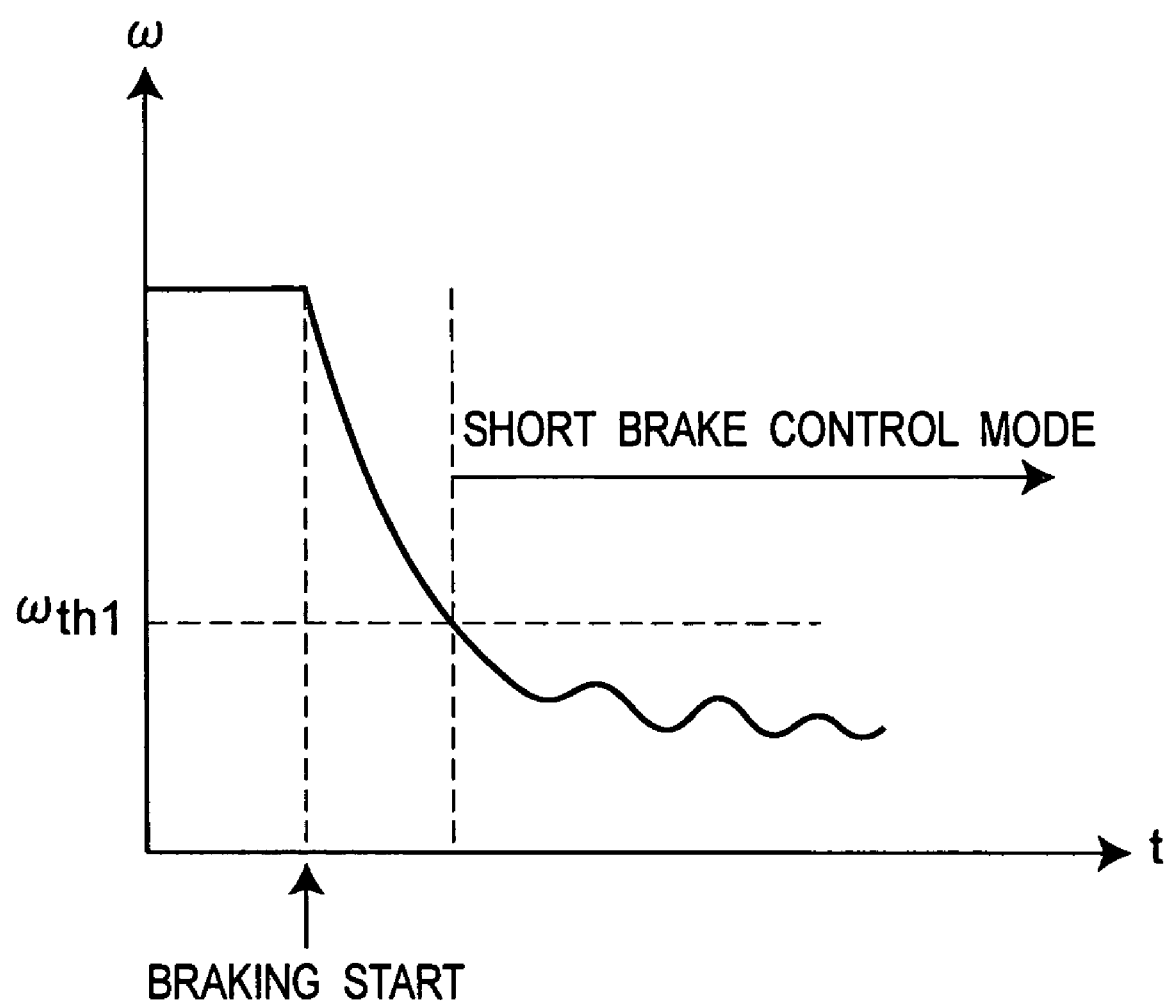
FIG. 5 is a diagram explaining transfer to a short brake control mode of the motor driving apparatus in the third embodiment of the invention.

Thus, this embodiment, only when the rotation speed of the rotor is less than or equal to the predetermined value ($\omega_{th1}$), compares the frequencies, judges on the basis of this result whether the changeover from the reverse torque brake control to the short brake control is performed, and thus enters into the operation mode (short brake control mode) for the short brake control when detecting the reversed state (See FIG. 5).

That is, the frequency comparator 71B detects the reversed state only when the rotor 10 is less than or equal to the specified rotation frequency. When the rotor 10 is rotating at above the specified speed, even if a reversed state is generated in the position signal FG, it is not detected and hence the reverse torque brake control is not changed over to the short brake control. Therefore, wrong operation of brake changeover control while the rotor 10 is rotating at high speed over the specified speed ($\omega_{th1}$) can be prevented, and operation of higher reliability is realized.

Fourth Embodiment

A motor driving apparatus in the fourth embodiment of the invention is described below.

Figure 6:
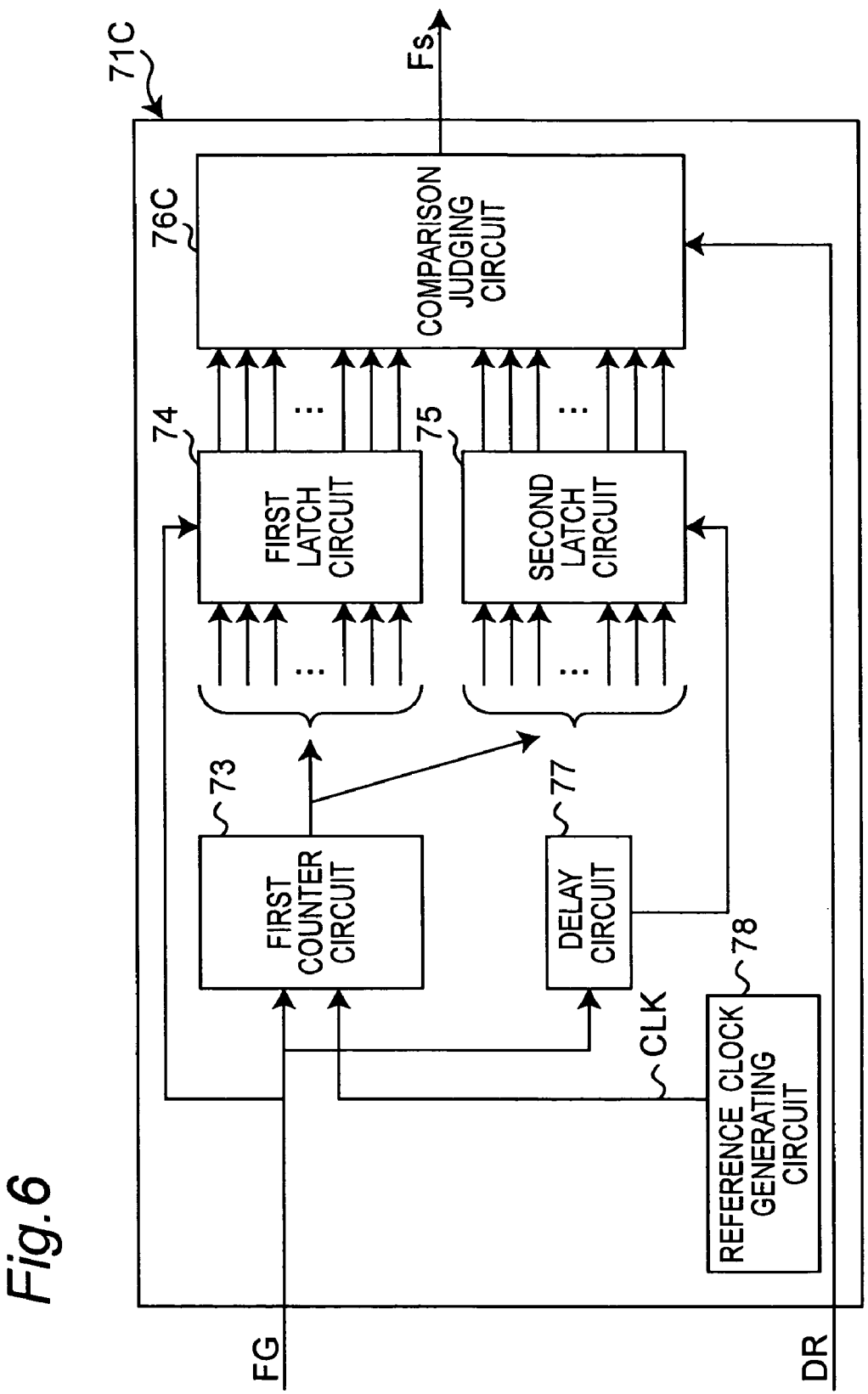
FIG. 6 is a block diagram of the frequency comparator of the motor driving apparatus in a fourth embodiment of the invention.

The present embodiment is the same in basic structure of the motor driving apparatus as the first embodiment, but the frequency comparator is different in internal structure. FIG. 6 is a block diagram of a frequency comparator 71 C in this embodiment.

The frequency comparator 71 C of the present embodiment detects the reversed state and makes the frequency comparison signal Fs active, when the variation width is larger than a predetermined value, if the relation is not inverted between the frequency of the earlier interval and the frequency of the later interval in two consecutive intervals of position signal FG. As a result, the brake control is changed over from the reverse torque brake control to the short brake control. The reason of such control is that there is a high possibility of occurrence of inversion or acceleration of rotation frequency right after sudden change (deceleration) of rotation frequency during brake, and it is intended to prevent occurrence of reversed state in advance to realize smooth and prompt stopping of the rotor.

In FIG. 6, the frequency comparator 71C includes a first counter circuit 73 for counting position signals FG on the basis of reference clock signal CLK, a first latch circuit 73 for latching the output of the first counter circuit 73 by synchronizing with the position signal FG, a delay circuit 77 for delaying the position signal FG by one period, a second latch circuit 75 for latching the output of the first counter circuit 73 by synchronizing with the output of the delay circuit 77, and a comparison judging circuit 76C operable to compare the output of the first latch circuit 74 with the output of the second latch circuit 75.

The operation of components other than the comparison judging circuit 76C is the same as that of the second embodiment and thus specific description is omitted herein.

The comparison judging circuit 76C receives output values of the first latch circuit 74 and the second latch circuit 75, and makes the frequency comparison signal Fs active when output value of the second latch circuit 75 is smaller than the (3/2) times value of the output value of the first latch circuit 74.

Figure 7:
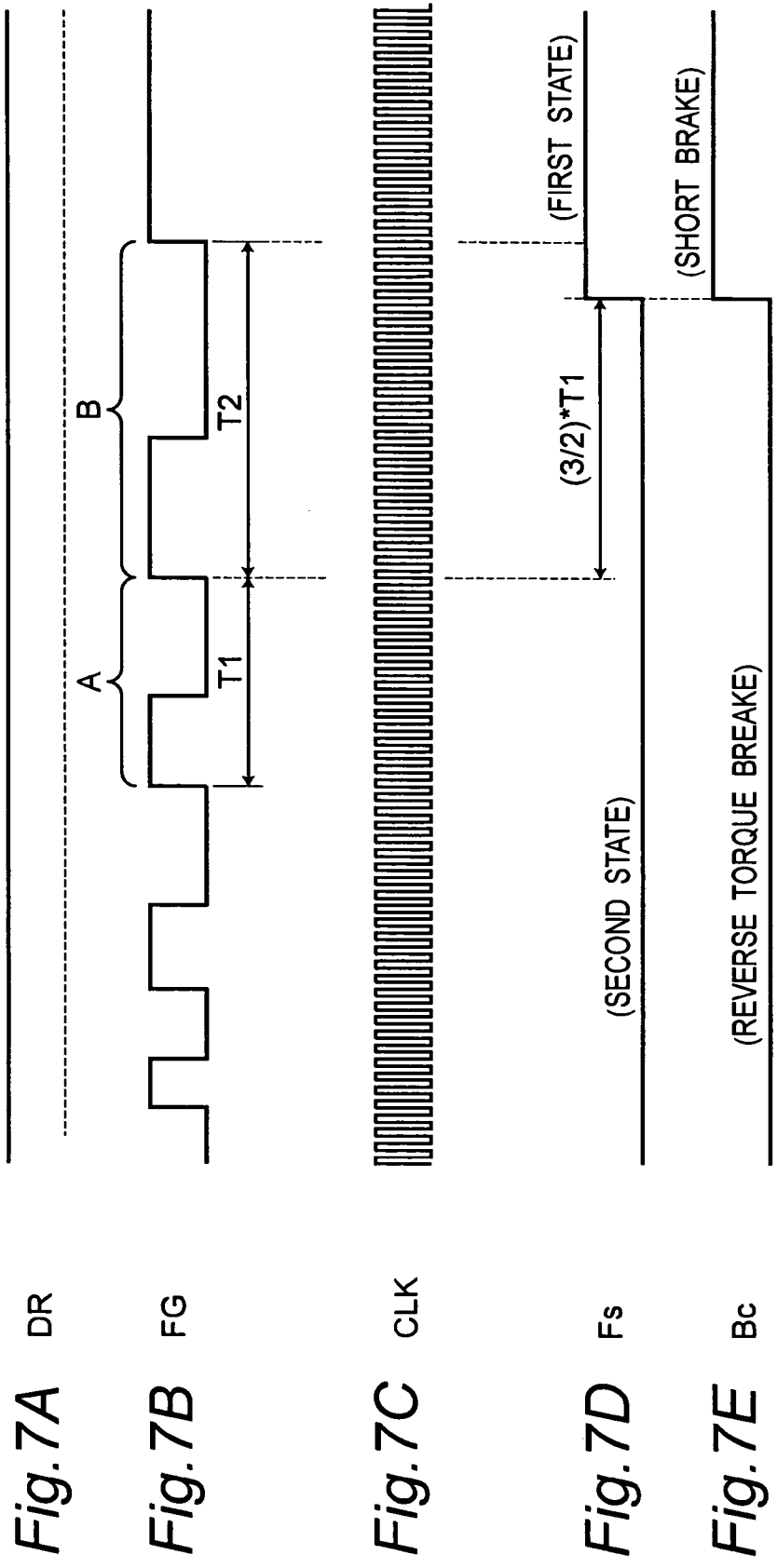
FIGS. 7A to 7E are timing charts of the frequency comparator in the fourth embodiment.

Referring to the timing chart in FIG. 7, the operation of the comparison judging circuit 76C is more specifically described below.

The comparison judging circuit 76C makes the output signal Fs active, when the output signal DR of the rotating state command generator 70 shows the reverse rotation command state and when the later signal B (having period T2) is not terminated even after passing of the time corresponding to 3/2 times (predetermined times) of period T1 of the earlier signal A from the end of the earlier signal A in time. That is, when the frequency of the later signal B is smaller than 2/3 times of the frequency of the earlier signal A, the output signal Fs is made active. As a result, the brake changeover unit 72 (see FIG. 1) outputs a brake changeover signal Bc to the commutation controller 60 to change over the reverse torque brake control to the short brake control. In the present embodiment, the brake control is changed over when the frequency of the later signal B is ⅔ times of the frequency of the earlier signal A, but as far as it is judged that a sudden change (deceleration) has taken place, the brake control may be changed over when the later signal B satisfies other relation to the earlier signal A.

Thus, during braking operation by the reverse torque brake control, the reverse brake control can be changed over to the short brake control before the rotor 10 behaves differently (for example, getting in acceleration state against the deceleration command) from the action corresponding to the rotation command signal DR output from the rotating state command generator 70, by detecting sudden decrease in the rotation frequency. Thus, the motor driving apparatus capable of stopping rotation of the rotor 10 more smoothly and promptly as compared to the prior art can be realized.

Fifth Embodiment

Figure 8:
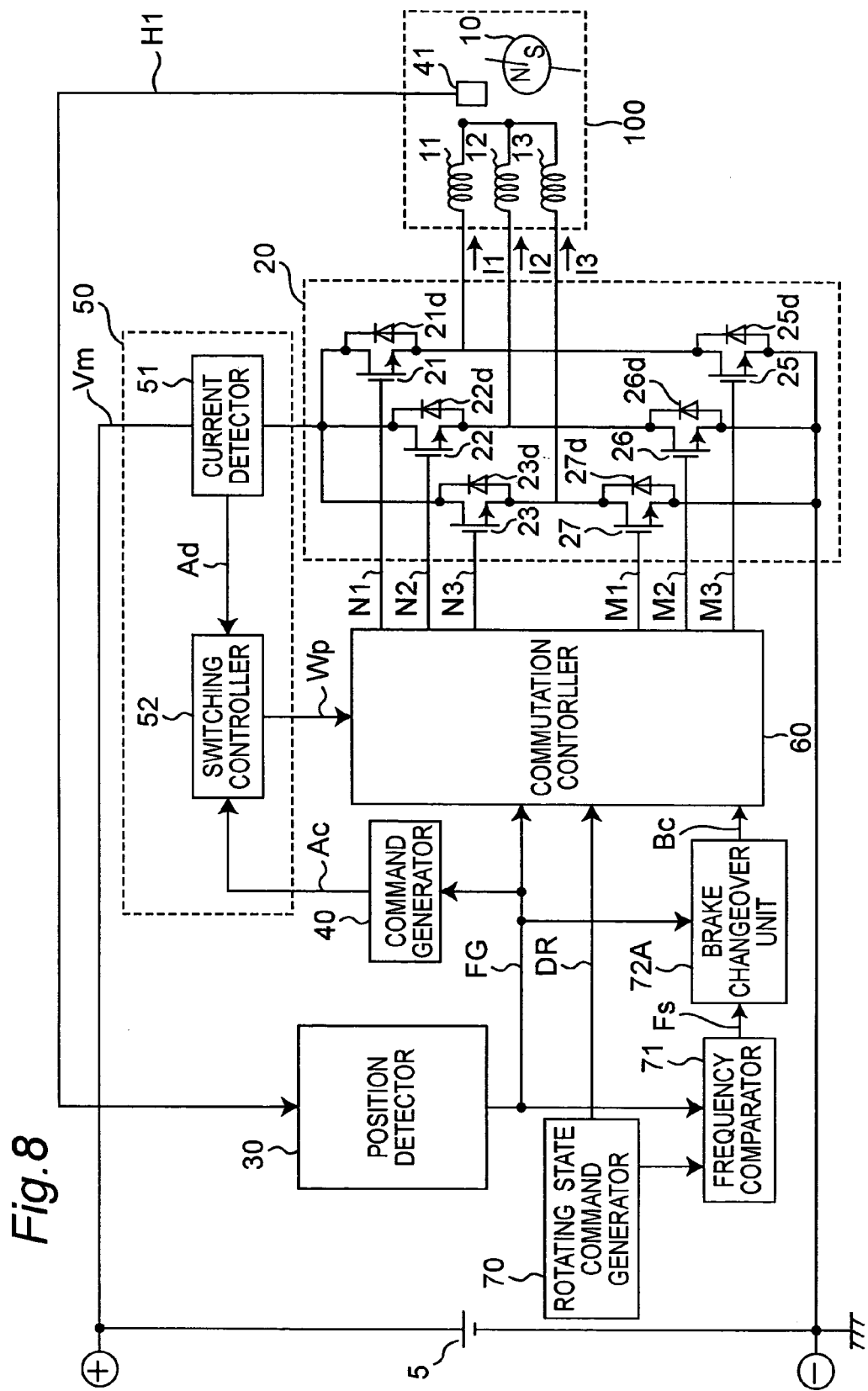
FIG. 8 is a block diagram of the motor driving apparatus in a fifth embodiment of the invention.

FIG. 8 shows a motor driving apparatus in the fifth embodiment of the invention is described below. The structure and operation of the motor driving apparatus of this embodiment are basically the same as the first embodiment except for a brake changeover unit 72A.

The brake changeover unit 72A of the present embodiment receives the position signal FG output from the position detector 30 and the frequency comparison signal Fs output from the frequency comparator 71, and outputs the brake changeover signal Bc on the basis of the position signal FG and the frequency comparison signal Fs.

Figure 9:
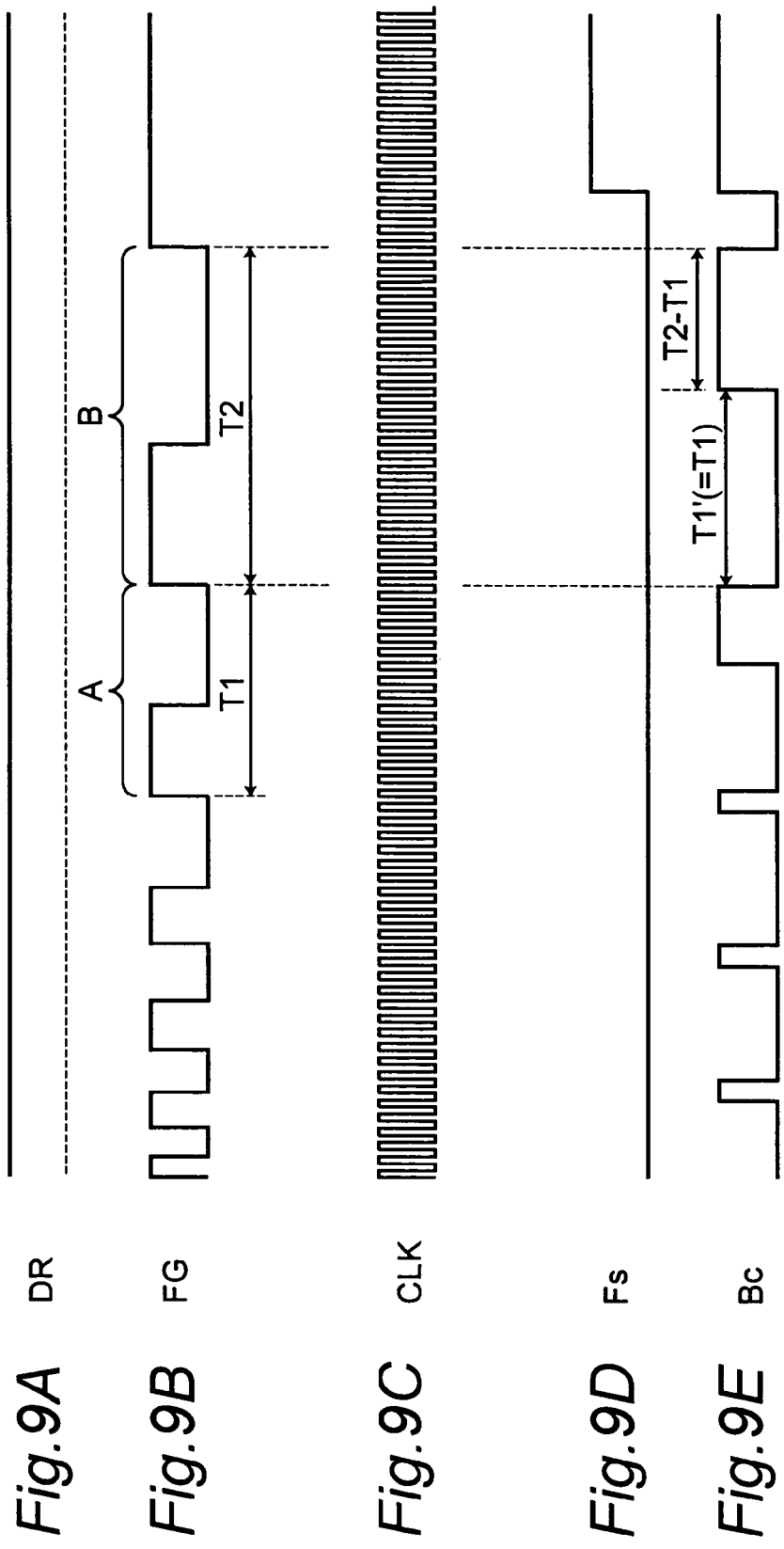
FIGS. 9A to 9E are timing charts of the motor driving apparatus in the fifth embodiment.

Referring now to the timing chart in FIGS. 9A to 9E, a specific operation of the brake changeover unit 72A is explained. When the output signal Fs of the frequency comparator 71 is non-active (not detecting reversed state), as shown in FIG. 9E, the brake changeover unit 72A operates as follows in each period of the signal FG.

Herein, out of the two consecutive signals A and B in each period of the signal FG, the later signal B is picked up and explained. When the output signal Fs of the frequency comparator 71 is non-active, the brake changeover unit 72A makes the brake changeover signal Bc active ("High") only for the duration of time difference (T2−T1) between the period (T1) of the earlier signal A and the period (T2) of the later signal B after lapse of time T1' equal to the period T1 of the signal A from the end point of the earlier signal A (see FIG. 9E). Afterwards, when the output signal Fs of the frequency comparator 71 becomes active (when the reversed state is detected), the brake changeover unit 72A makes the brake changeover signal Bc active in order to instruct the short brake control from this moment (see FIG. 9D).

Thus, the short brake control conducted for the duration of difference in period between earlier signal A and later signal B in the period of the later signal B in the position signal FG prevents operation of current feed control different from the actual position in the rotor 10. Hence, the motor driving apparatus capable of stopping rotation of the rotor 10 smoothly and promptly can be realized.

Sixth Embodiment

Figure 10:
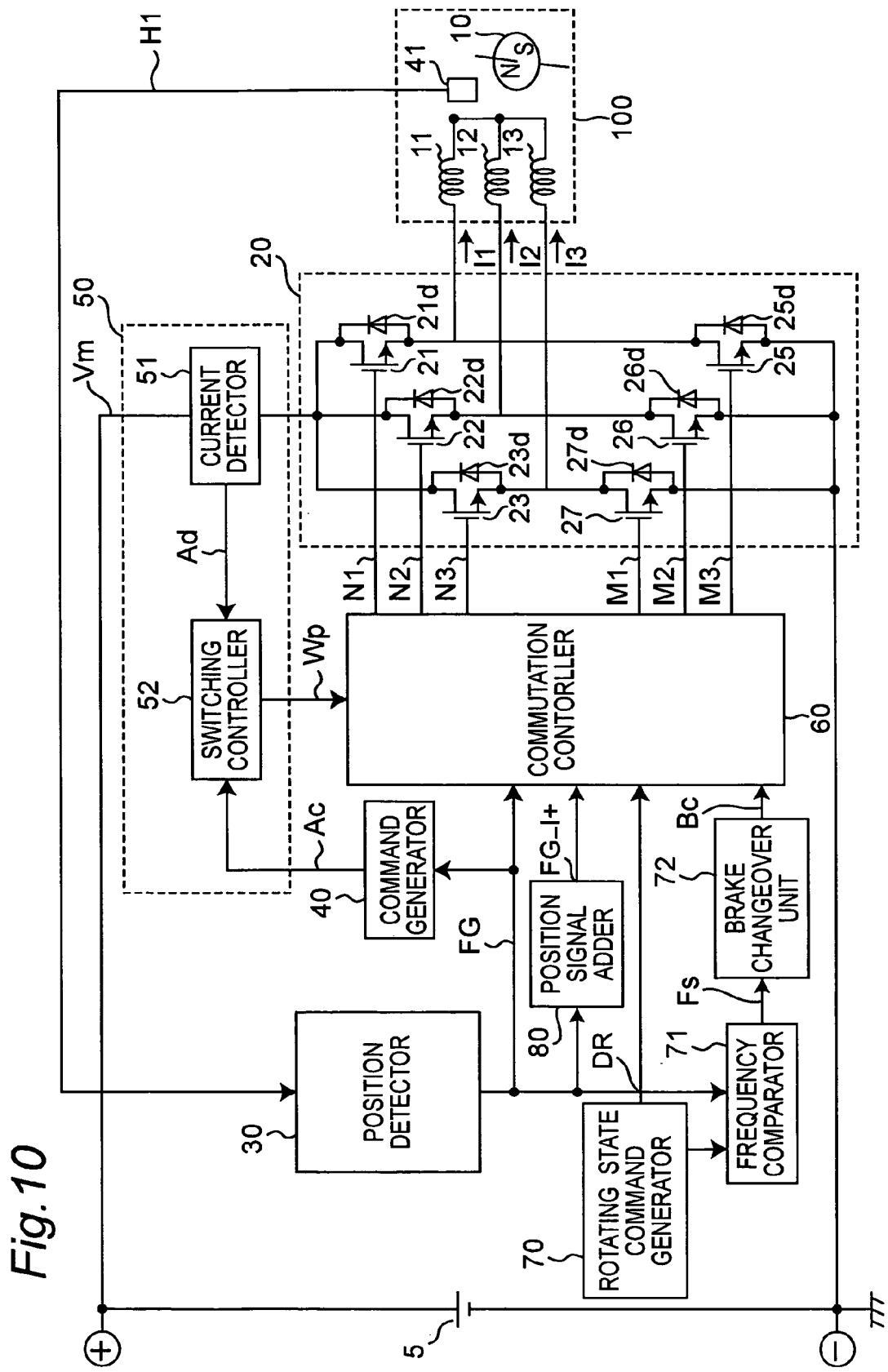
FIG. 10 is a block diagram of the motor driving apparatus in the sixth embodiment of the invention.

FIG. 10 shows a motor driving apparatus in the sixth embodiment of the invention. The structure and operation of the motor driving apparatus of the present embodiment are basically the same as those of the first embodiment except that a position signal adder is provided.

In FIG. 10, a position signal adder 80 receives the position signal FG output from the position detector 30, adds a predetermined time to the period of the input position signal FG to generate a new signal, and outputs the generated signal as an added position signal FG_I+. The commutation controller 60 controls the switching operation of the power amplifiers 21 to 23, 25 to 27 on the basis of the added position signal FG_I+.

Figure 11:
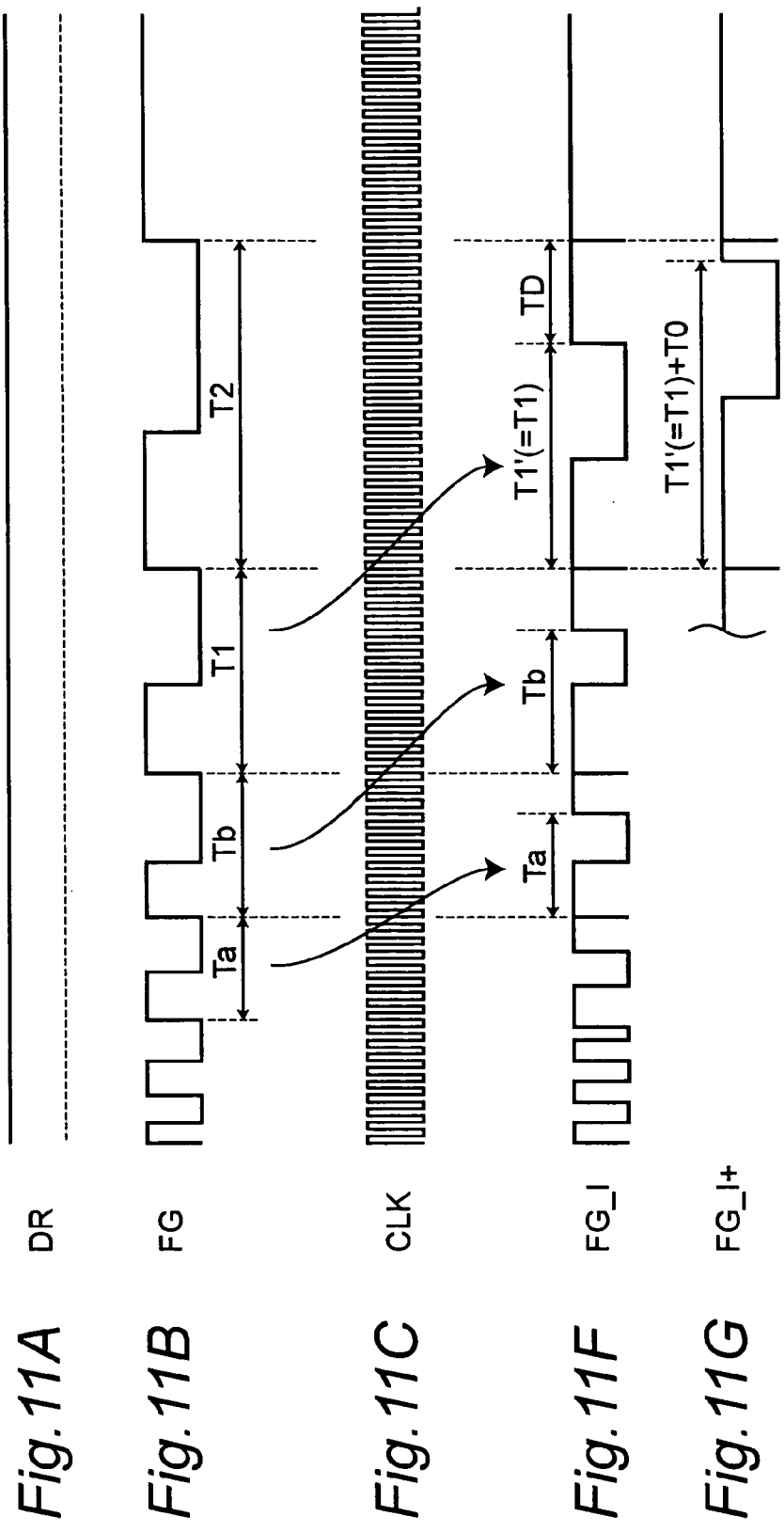
FIGS. 11A to 11C and 11F to 11G are timing charts of the motor driving apparatus in the sixth embodiment.

Referring now to the timing charts in FIGS. 11A to 11C, 11F and 11G, a specific operation of the motor driving apparatus of the present embodiment is explained. FIG. 11B shows the position signal FG, and FIG. 11F shows the position signal FG_I that is generated on the basis of the position signal one period before under the condition that the position signal of one period before is used in the commutation controller. FIG. 11G shows the output of the position signal adder 80, showing the signal FG_I+ that is obtained by adding a predetermined time (T0) to the position signal of one period before.

When the output signal DR of the rotating state command generator 70 shows a reverse rotation command (see FIG. 11A), the predetermined time T0 is added to the position signal FG output from the position detector 30, and the period of the obtained added position signal FG_I+ (see FIG. 11G) is used as a conduction period in the commutation controller 60.

Thus, as the signal for use in the commutation controller 60, the added position signal FG_I+ with the predetermined time T0 added is used. Accordingly, as compared with the case of using the usual position signal one period before (see FIG. 11F), it is more effective to decrease the deviation between the conduction period used in the commutation controller 60 and the actual rotation period of the rotor 10. That is, as shown in FIGS. 11B and 11F, deviation TD between the period T1' in the signal FG and the period T2 in the signal FG_I is corrected by the predetermined time T0, and a position signal more accurately depending on the actual rotation period of the rotor 10 can be obtained, and the conduction period for control with higher precision can be obtained. Herein, the predetermined time T0 is preferred to be set at about ½ or less of the time corresponding to the period T1 to which the predetermined time T0 is added. The predetermined time T0 may be determined depending on the period T1 to be added, and, for example, the period T1 to be added may be multiplied by a specific rate (α%). In such constitution, a motor driving apparatus capable of stopping rotation of the rotor 10 smoothly and promptly can be realized.

Seventh Embodiment

A motor driving apparatus in the seventh embodiment of the invention is described below.

Figure 12:
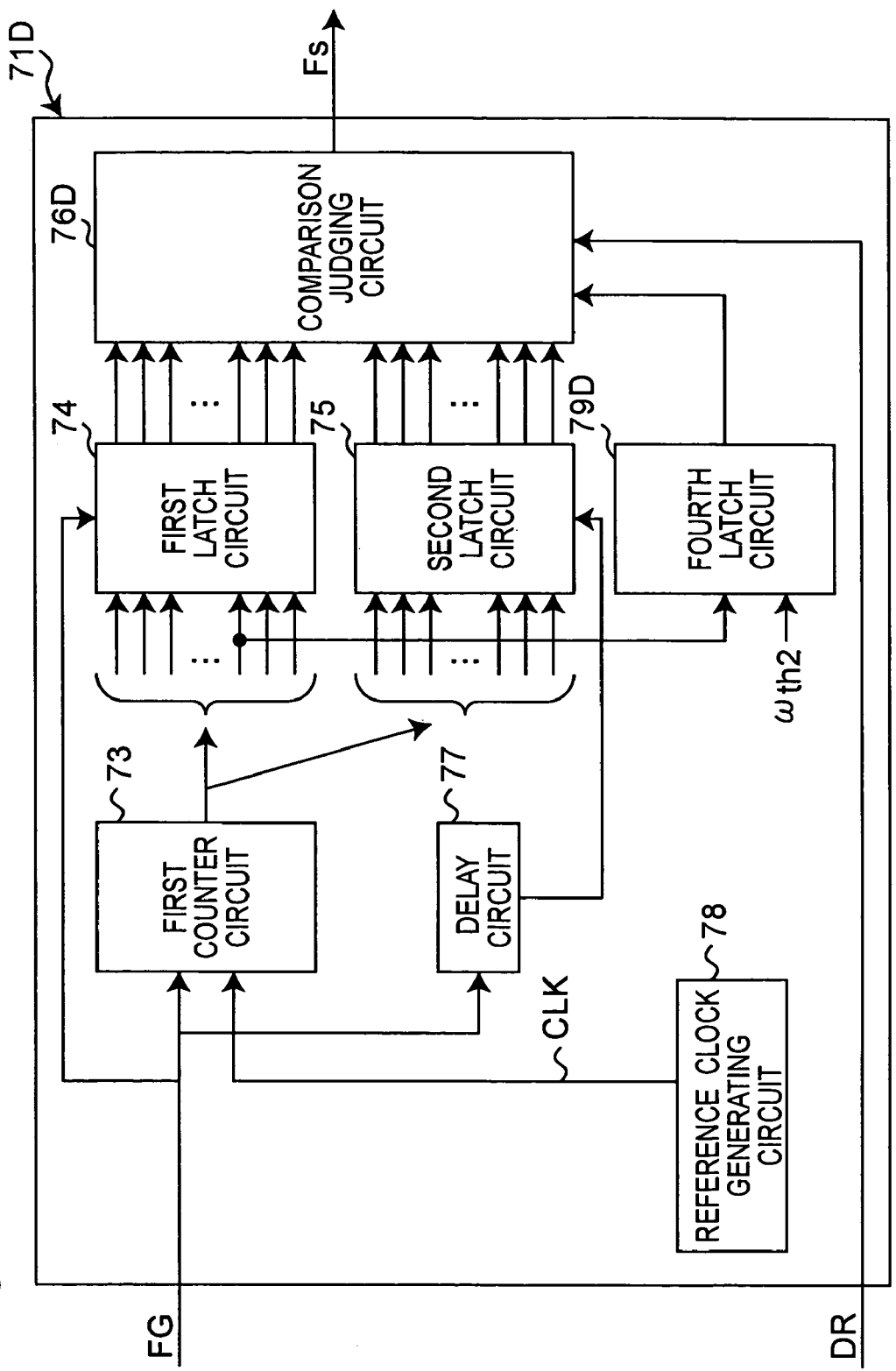
FIG. 12 is a block diagram of the frequency comparator of the motor driving apparatus in the seventh embodiment of the invention.

The basic structure of the motor driving apparatus of the present embodiment is the same as the first embodiment except for the internal structure of the frequency comparator. FIG. 12 shows a structure of the frequency comparator 71D.

Figure 13A:
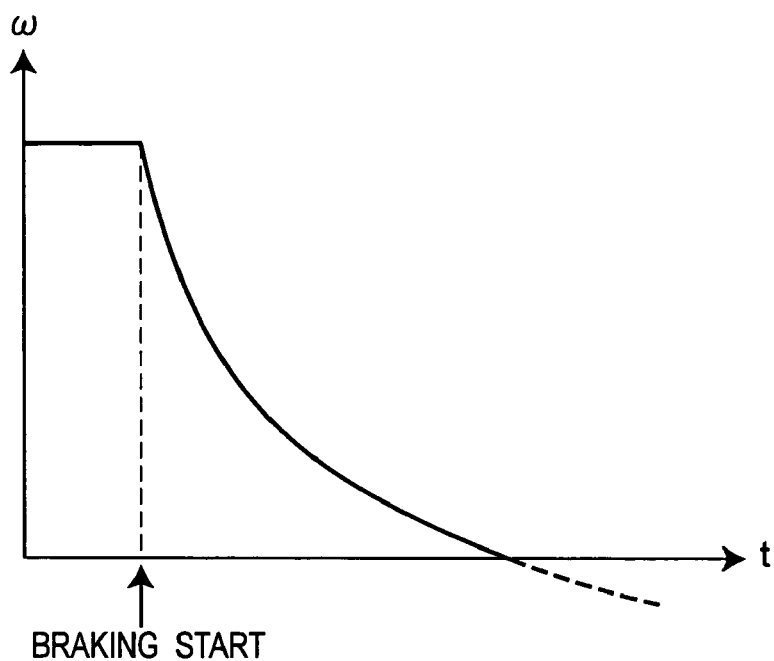
FIG. 13A is a diagram showing a change in rotating speed of the rotor when keeping reverse torque brake.
Figure 13B:
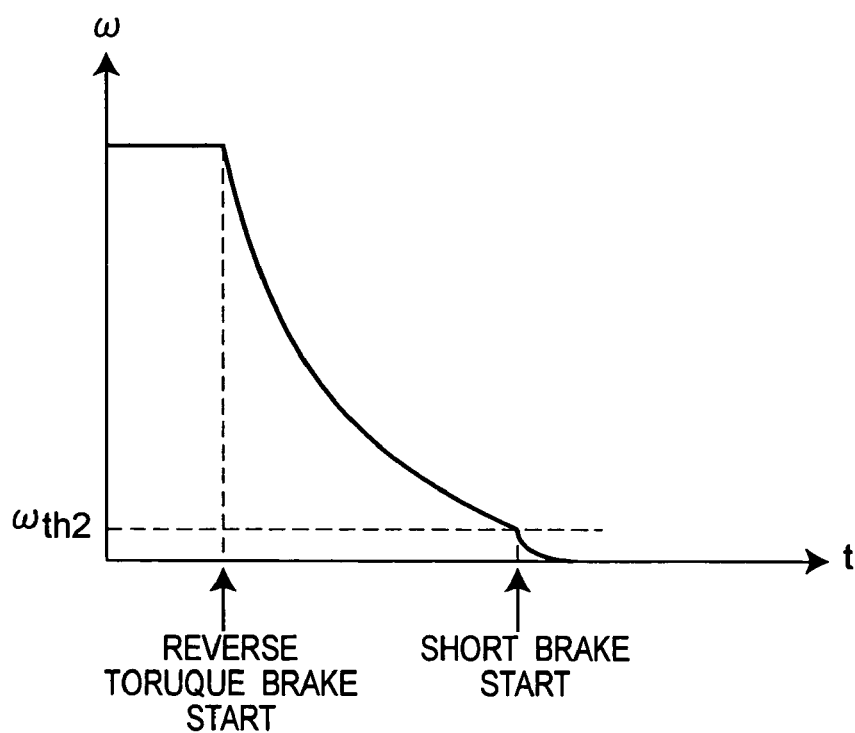
FIG. 13B is a diagram showing a change in rotor rotating speed of the rotor by brake control of the motor driving apparatus in the seventh embodiment.

As the rotor 10 is being decelerated by a reverse torque brake, as shown in FIG. 13A, a phenomenon appears in which the rotating speed of the rotor 10 once drops to zero and then the rotation is reversed. Such phenomenon may lead to wrong detection of the rotating state of the rotor 10 or malfunction of the motor. In the present embodiment, accordingly, a predetermined rotation frequency ($\omega_{th2}$) showing a very low speed close to the stopped state is set as shown in FIG. 13B, and when the rotation frequency of the rotor 10 becomes smaller than the predetermined value ($\omega_{th2}$), the short brake is applied to brake. Hence such wrong detection or malfunction can be prevented. This control is effective when the reversed state is not detected even when a rotating speed falls in speed close to stopped state during the brake control but the brake control is not changed over from the reverse torque control to the short brake control.

In FIG. 12, the frequency comparator 71D includes a first counter circuit 73 for counting a position signal FG on the basis of a reference clock signal CLK, a first latch circuit 74 for latching the output of the first counter circuit 73 by synchronizing with the position signal FG, a delay circuit 77 for delaying the position signal FG by one period, a second latch circuit 75 for latching the output of the first counter circuit 73 by synchronizing with the output of the delay circuit 77, a comparison judging circuit 76D for comparing the output of the first latch circuit 74 with the output of the second latch circuit 75, and a fourth latch circuit 79D for receiving and latching at least one output signal from the first counter circuit 74.

The operation of other parts than the fourth latch circuit 79D and the comparison judging circuit 76D is the same as the second embodiment, and specific description is omitted herein.

The count value of the first counter circuit 73 is expressed in plural bits. Out of the plural bits, at least one output signal (one bit) of the first counter circuit 73 corresponding to the predetermined rotation frequency ($\omega_{th2}$) of the rotor 10 is fed into the fourth latch circuit 79D. Herein, the predetermined rotation frequency ($\omega_{th2}$) is set at a value close to stopping of the rotor 10.

The fourth latch circuit 79D makes the output signal Fs active when the rotation frequency of the rotor 10 is equal to or lower than the predetermined rotation frequency ($\omega_{th2}$), and makes the output signal of the fourth latch circuit 79D non-active when the rotor 10 is higher than the predetermined rotation frequency ($\omega_{th2}$).

The output signal of the fourth latch circuit 79D is fed into the comparison judging circuit 76D. The comparison judging circuit 76D compares the output signal of the first latch circuit 74 with the output signal of the second latch circuit 75 and outputs the result of comparison as frequency comparison signal Fs, when the output signal Fs of the fourth latch circuit 79D is non-active, that is, when the rotation frequency of the rotor 10 is larger than the predetermined value ($\omega_{th2}$). In this case, the reverse torque control and the short brake control are changed over on the basis of the frequency comparison signal Fs.

On the other hand, when the output signal of the fourth latch circuit 79D is active, that is, when the rotation frequency of the rotor 10 is equal to or lower than the predetermined rotation frequency ($\omega_{th2}$), the comparison judging circuit 76D does not compare the frequencies, but makes the frequency comparison signal Fs active forcibly. That is, as long as the rotor 10 is less than or equal to the predetermined rotation frequency ($\omega_{th2}$), regardless of the comparison result of output signal of the first latch circuit 74 with output signal of the second latch circuit 75, or regardless of the rotating state of the rotor 10, the frequency comparator 76D outputs a frequency comparison signal Fs which is active. When receiving this frequency comparison signal Fs, the brake changeover unit 72 makes the brake changeover signal Bc active, thereby applying the short brake control.

Thus, the frequency comparison signal Fs is made active by force to implement the short brake control near the stopping point of the rotor 10 (near rotation frequency zero point). Thereby, after stopping the rotor 10, wrong detection of rotating state when starting reverse rotation can be prevented, and braking operation of higher reliability can be realized.

Eighth Embodiment

Figure 14:
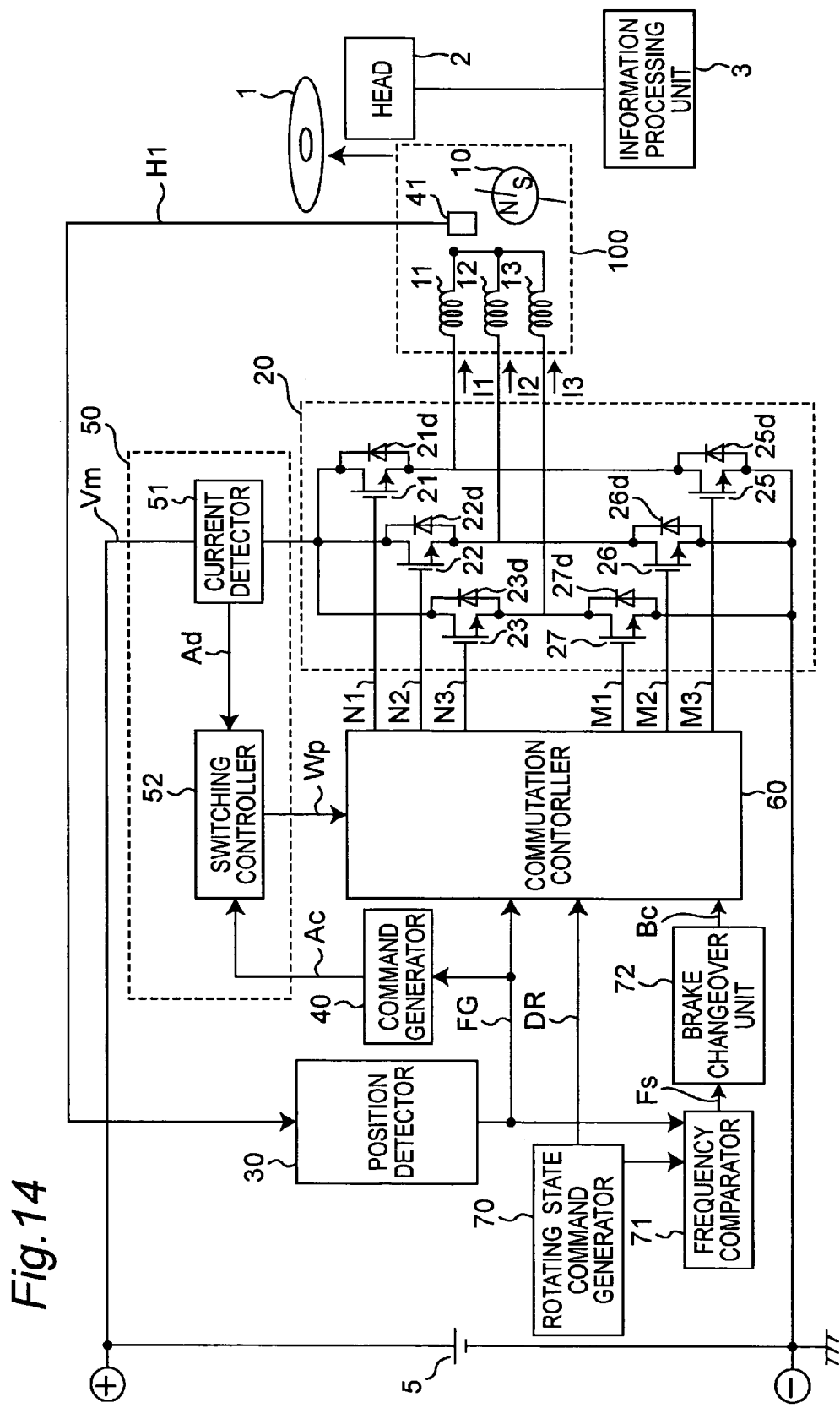
FIG. 14 is a block diagram of a disk appaaratus of the invention (eight embodiment).
Figure 15:
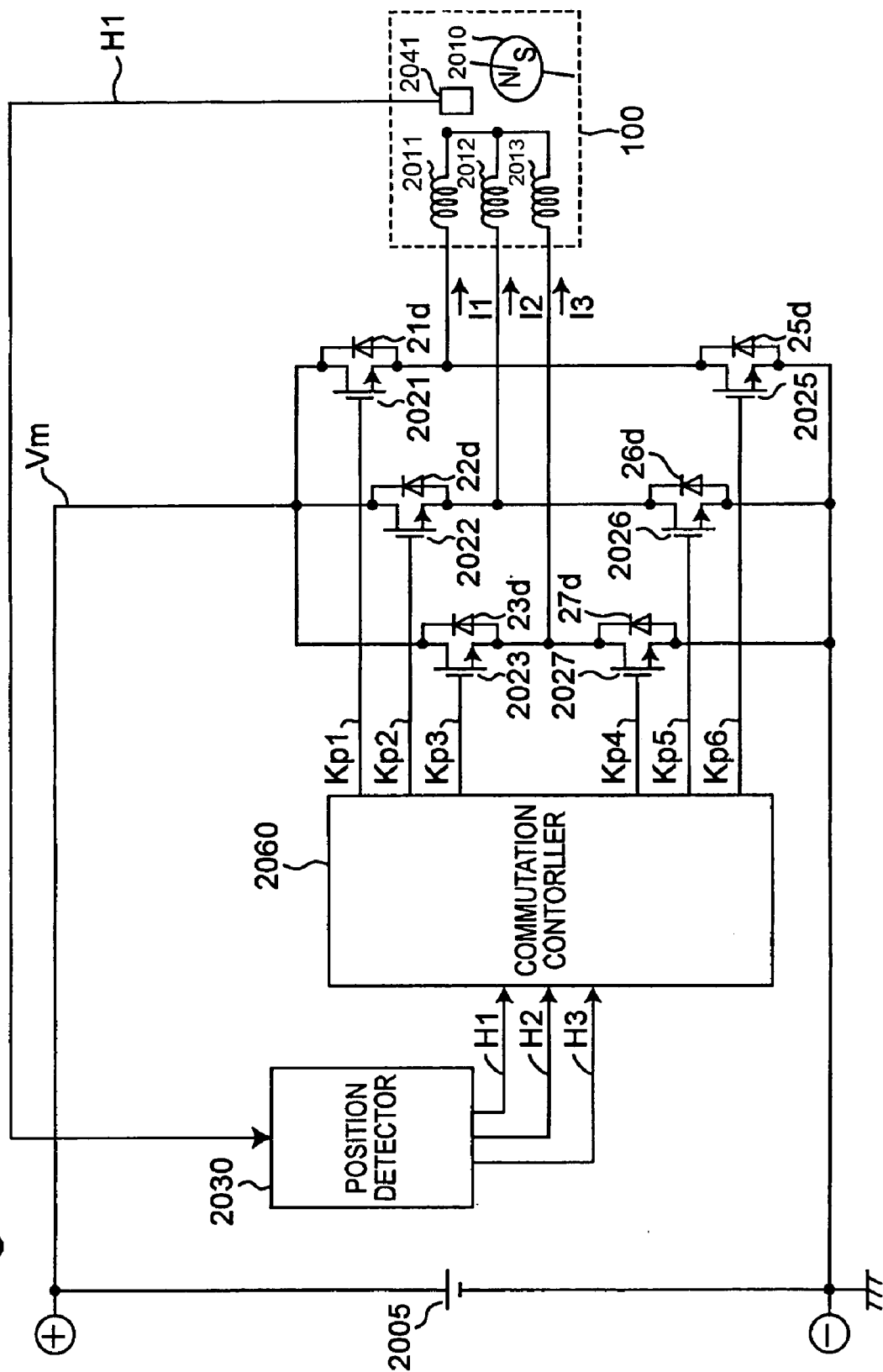
FIG. 15 is a block diagram of a conventional motor driving apparatus.

FIG. 14 is a block diagram of a disk apparatus according to the present invention.

The disk apparatus shown in FIG. 14 includes a motor driving apparatus as explained in any one of the foregoing embodiments, a motor 100, a head 2 for recording or reproducing information in a disk 1, and an information processing unit 3.

The disk 1 is a recording medium for recording and reproducing information signals such as a hard disk and an optical disk, and it is rotated and supported by the motor 100. Digital information signals (such as audio and video signals of high quality) are recorded in the disk 1. The head 2 is composed of an optical head or a magnetic head, and it reproduces a signal from the disk 1 or records a signal to the disk 1. The information processing unit 3 processes the signal read out from the head 2, and outputs a reproduced signal (for example, audio or video signal of high quality), or creates a recorded signal in the disk I through the head 2.

The disk 1 is coupled to a rotor 10, and is directly rotated and driven by the rotor 10, and therefore the state of rotation of the disk 1 depends on the state of rotation of the rotor 10. According to the motor of the foregoing preferred embodiments, the rotor 10 can rotate stably at high reliability, and hence the disk 1 rotated and supported by the rotor 10 can also be driven and controlled in speed at high precision. As a result, a disk apparatus of high reliability and low cost can be presented.

Various preferred embodiments about the motor driving apparatus of the invention are explained above. The motor driving apparatus of the invention is preferably used in, for example, a disk apparatus, and its applications are wide including the rotating and driving apparatuses of office automation equipment, audio-video appliances or the like. Generally, it can be widely used as a driving apparatus of the motor for controlling speed.

In the illustrated embodiments, only one position detecting element 41 is used, and the position detector 30 receives a single position detection signal H1 output from the position detecting element 41, processes the waveform as a digital value, and outputs a single position signal FG. However, two or three position detecting elements 41 may also be used. In this case, at least one position signal should be output from the position detector 30. Use of two or three position detecting elements 41 can enhance the controllability as compared with the case of using only one position detecting element 41, obtaining the same or greater effects as compared with the case of using only one position detecting element 41. Alternatively, no position detecting element may be used. In such a case, the position detector 30 may use the voltage induced in the coils 11, 12 and 13 by rotation of the rotor 10 as position detection signals, and outputs a position signal, so that the same effects as when receiving the position signal from the position detecting element may be obtained.

It is noted that the specific configuration of the preferred embodiments may be changed and modified in various forms. For example, coils 11, 12 or 13 of each phase of the motor 100 may be composed by connecting a plurality of partial coils in series or in parallel. Three phases of coils may be coupled either in star wiring or in delta wiring. The number of phases of coils is not limited to three alone, and the idea of the foregoing embodiments can be similarly applied in a structure having a plurality of phases of coils. The number of magnetic poles of the field section of the rotor 10 is not limited to two poles, but may be four or more.

Power transistors 21 to 23 and 25 to 27 of the power supply unit 20 include NPN bipolar transistors, PNP bipolar transistors, N-channel field effect transistors, P-channel field effect transistors, IGBT transistors, and other various transistors. High frequency switching operation of power transistors can reduce power loss and heat generation of power transistors, and provide easy integration of the circuit.

The invention may further be changed or modified without departing from its true spirit, and all such changes are embraced within the scope of the invention.

INDUSTRIAL APPLICABILITY

The motor driving apparatus of the present invention is a motor driving apparatus capable of stopping rotation of the rotor smoothly and promptly, with low manufacturing cost, and can be widely used in rotating and driving apparatuses of office automation equipment, audio-video appliances and others. It is preferably used, for example, in a disk apparatus for recording and reproducing information in a rotary disk. The motor driving apparatus of the invention is also used widely as a general driving apparatus of a motor for controlling the speed.

The present disclosure relates to subject matter contained in Japanese Patent Application No. 2003-278329, filed on Jul. 23, 2003, which is expressly incorporated herein by reference in its entirety.

What is claimed is:

1. An apparatus for driving a motor that includes a rotor having a field section generating field magnetic flux and plural phases of coils, the apparatus comprising:
   a power source that supplies a direct-current voltage;
   a power supply unit that includes a plurality of switching elements, and converts direct-current voltage from the power source into a desired alternating-current voltage to supply driving power to the motor;
   a position detector that detects a rotating position of the rotor of the motor and outputs the detection result as a position signal;
   a controller that controls switching action of the switching elements of the power supply unit based on the position signal;
   a frequency comparator that, during a period after brake control of the motor is started and before the motor speed reaches zero, compares frequencies of at least two consecutive periods in the position signal, detects a reversed state in which a frequency of the signal in a later output period becomes higher than a frequency of the signal in an earlier output period, and outputs a signal showing the detection result;
   a rotating state command generator that outputs a command signal for exciting and controlling the coil so as to apply normal torque or reverse torque to the rotor; and
   a brake changeover unit that selects, as a brake control of the motor, either a reverse torque brake control for braking the rotation of the rotor by applying a reverse torque to the rotor, or a short brake control for braking rotation of the rotor by short-circuiting the coil of the motor, and instructs the controller to implement the selected brake control,
   wherein the brake changeover unit selects the reverse torque brake control when the detection signal from the frequency comparator does not show the reversed state, or selects the short brake control when the detection signal shows the reversed state when the rotating state command generator is issuing a command signal for applying reverse torque, and then instructs the controller to implement the selected brake control.

2. The motor driving apparatus according to claim 1, wherein the frequency comparator comprises:
   a reference clock signal generator that outputs a reference clock signal;
   a counter circuit that measures the reference clock signal in a period corresponding to the position signal;
   a first latch circuit that latches the output of the counter circuit;
   a delay circuit that delays the position signal by one period;
   a second latch circuit that latches the output of the counter circuit in synchronism with the output of the delay circut; and
   a comparison judging circuit that compares the output signal of the first latch circuit with the output signal of the second latch circuit, and detects the reversed state to output the detection signal.

3. A disk apparatus comprising:
   an apparatus according to claim 2 serving as an apparatus for driving a motor which rotates and drives a recording medium;
   a head unit that reproduces and/or records a signal from/to the recording medium; and
   an information processing unit that processes a signal which is reproduced by the head unit and/or recorded information which is recorded in the recording medium by the head unit.

4. The motor driving apparatus according to claim 1, wherein the frequency comparator detects the reversed state, only when the command signal for applying reverse torque is output from the rotating state command generator and the frequency of the position signal is lower than a predetermined value.

5. A disk apparatus comprising:
   an apparatus according to claim 4 serving as an apparatus for driving a motor which rotates and drives a recording medium;
   a head unit that reproduces and/or records a signal from/to the recording medium; and
   an information processing unit that processes a signal which is reproduced by the head unit and/or recorded information which is recorded in the recording medium by the head unit.

6. The motor driving apparatus according to claim 1, wherein the frequency comparator outputs the detection signal showing the reversed state, only when the command signal for applying reverse torque is output from the rotating state command generator and the frequency of the signal in the later output period is lower than $2/3$ times of the frequency of the signal in the earlier output period.

7. A disk apparatus comprising:
   an apparatus according to claim 6 serving as an apparatus for driving a motor which rotates and drives a recording medium;
   a head unit that reproduces and/or records a signal from/to the recording medium; and
   an information processing unit that processes a signal which is reproduced by the head unit and/or recorded information which is recorded in the recording medium by the head unit.

8. The motor driving apparatus according to claim 1, wherein the brake changeover unit selects the short brake control during a period between the moment when a duration of the earlier output period elapses after the end of the earlier output interval and the moment when the position signal of the next period is detected.

9. A disk apparatus comprising:
an apparatus according to claim 8 serving as an apparatus for driving a motor which, rotates and drives a recording medium;
a head unit that reproduces and/or records a signal from/to the recording medium; and
an information processing unit that processes a signal which is reproduced by the head unit and/or recorded information which is recorded in the recording medium by the head unit.

10. The motor driving apparatus according to claim 1, further comprising a position signal adder that adds a predetermined duration to the position signal and outputs an added position signal, wherein the controller controls the switching action of the switching elements according to the added position signal.

11. A disk apparatus comprising:
an apparatus according to claim 10 serving as an apparatus for driving a motor which rotates and drives a recording medium;
a head unit that reproduces and/or records a signal from/to the recording medium; and
an information processing unit that processes a signal which is reproduced by the head unit and/or recorded information which is recorded in the recording medium by the head unit.

12. The motor driving apparatus according to claim 1, wherein the frequency comparator outputs a detection signal showing the reversed state, when the command signal for applying reverse torque is output from the rotating state command generator and the frequency in the period of the position signal is lower than a predetermined value.

13. A disk apparatus comprising:
an apparatus according to claim 12 serving as an apparatus for driving a motor which rotates and drives a recording medium;
a head unit that reproduces and/or records a signal from/to the recording medium; and
an information processing unit that processes a signal which is reproduced by the head unit and/or recorded information which is recorded in the recording medium by the head unit.

14. The motor driving apparatus according to claim 1, wherein the position detector includes a position detecting element that detects the magnetic flux of the field section of the rotor and generates the position signal.

15. A disk apparatus comprising:
an apparatus according to claim 14 serving as as apparatus for driving a motor which rotates and drives a recording medium;
a head unit that reproduces and/or records a signal from/to the recording; and
an information processing unit that process a signal which is reproduced by the head unit and/or recorded information which is recorded in the recording medium by the head unit.

16. A disk apparatus comprising:
an apparatus according to claim 1 serving as an apparatus for driving a motor which rotates and drives a recording medium;
a head unit that reproduces and/or records a signal from/to the recording medium; and
an information processing unit that processes a signal which is reproduced by the head unit and/or recorded information which is recorded in the recording medium by the head unit.

* * * * *

UNITED STATES PATENT AND TRADEMARK OFFICE
CERTIFICATE OF CORRECTION

PATENT NO. : 7,073,872 B2 Page 1 of 1
APPLICATION NO. : 10/896027
DATED : July 11, 2006
INVENTOR(S) : Masaki Tagome et al.

It is certified that error appears in the above-identified patent and that said Letters Patent is hereby corrected as shown below:

Column 17

Line 9, "which, rotates" should read --which rotates--.

Column 18

Line 16, "serving as as apparatus" should read --serving as an apparatus--.

Line 20, "recording; and" should read --recording medium; and--.

Signed and Sealed this

Twenty-third Day of January, 2007

JON W. DUDAS
*Director of the United States Patent and Trademark Office*